United States Patent
Harada

(10) Patent No.: US 9,420,278 B2
(45) Date of Patent: Aug. 16, 2016

(54) AUDIOVISUAL CONTENT GENERATION METHOD FOR MULTISTAGE HIGH-SPEED REPRODUCTION

(71) Applicant: NEC CORPORATION, Minato-ku, Tokyo (JP)

(72) Inventor: Chihiro Harada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 879 days.

(21) Appl. No.: 13/655,099

(22) Filed: Oct. 18, 2012

(65) Prior Publication Data

US 2013/0136194 A1 May 30, 2013

(30) Foreign Application Priority Data

Nov. 28, 2011 (JP) .................................. 2011-259335

(51) Int. Cl.
*H04N 5/783* (2006.01)
*H04N 9/806* (2006.01)
*H04N 9/87* (2006.01)
*H04N 19/00* (2014.01)
*H04N 19/132* (2014.01)

(52) U.S. Cl.
CPC ............... *H04N 19/00* (2013.01); *H04N 5/783* (2013.01); *H04N 9/806* (2013.01); *H04N 9/87* (2013.01); *H04N 19/132* (2014.11)

(58) Field of Classification Search
None
See application file for complete search history.

(56) References Cited

U.S. PATENT DOCUMENTS

| | | | |
|---|---|---|---|
| 6,275,537 B1 * | 8/2001 | Lee .......................... | 375/240.28 |
| 6,360,202 B1 * | 3/2002 | Bhadkamkar et al. ........ | 704/270 |
| 2003/0165321 A1 * | 9/2003 | Blair et al. ..................... | 386/68 |
| 2003/0165325 A1 * | 9/2003 | Blair et al. ..................... | 386/75 |

FOREIGN PATENT DOCUMENTS

| | | | |
|---|---|---|---|
| JP | 11355719 A | 12/1999 | |
| JP | 2001-069691 A | 3/2001 | |
| JP | 2006-011793 A | 1/2006 | |
| JP | 2010-166690 A | 7/2010 | |

OTHER PUBLICATIONS

Japanese Office Action for JP Application No. 2014-227230 mailed on Jul. 21, 2015.

* cited by examiner

*Primary Examiner* — William C Vaughn, Jr.
*Assistant Examiner* — Lindsay Uhl

(57) ABSTRACT

The present invention is to solve a problem that, at the time of high-speed reproduction using compressed video data, an audio distribution bandwidth increases simply in proportion to a high-speed reproduction rate. An encoding device includes: an audio encoding part configured to encode an audio signal; a video encoding part configured to encode a video signal; and a multiplexing part configured to multiplex audio data outputted by the audio encoding part and video data outputted by the video encoding part. The multiplexing part is configured to, at the time of high-speed reproduction, multiplex by locating audio data within a predetermined range into a picture configuring video data, the picture being distributed at a speed equal to or less than a predetermined reproduction speed but being not distributed at a speed more than the predetermined reproduction speed.

6 Claims, 7 Drawing Sheets

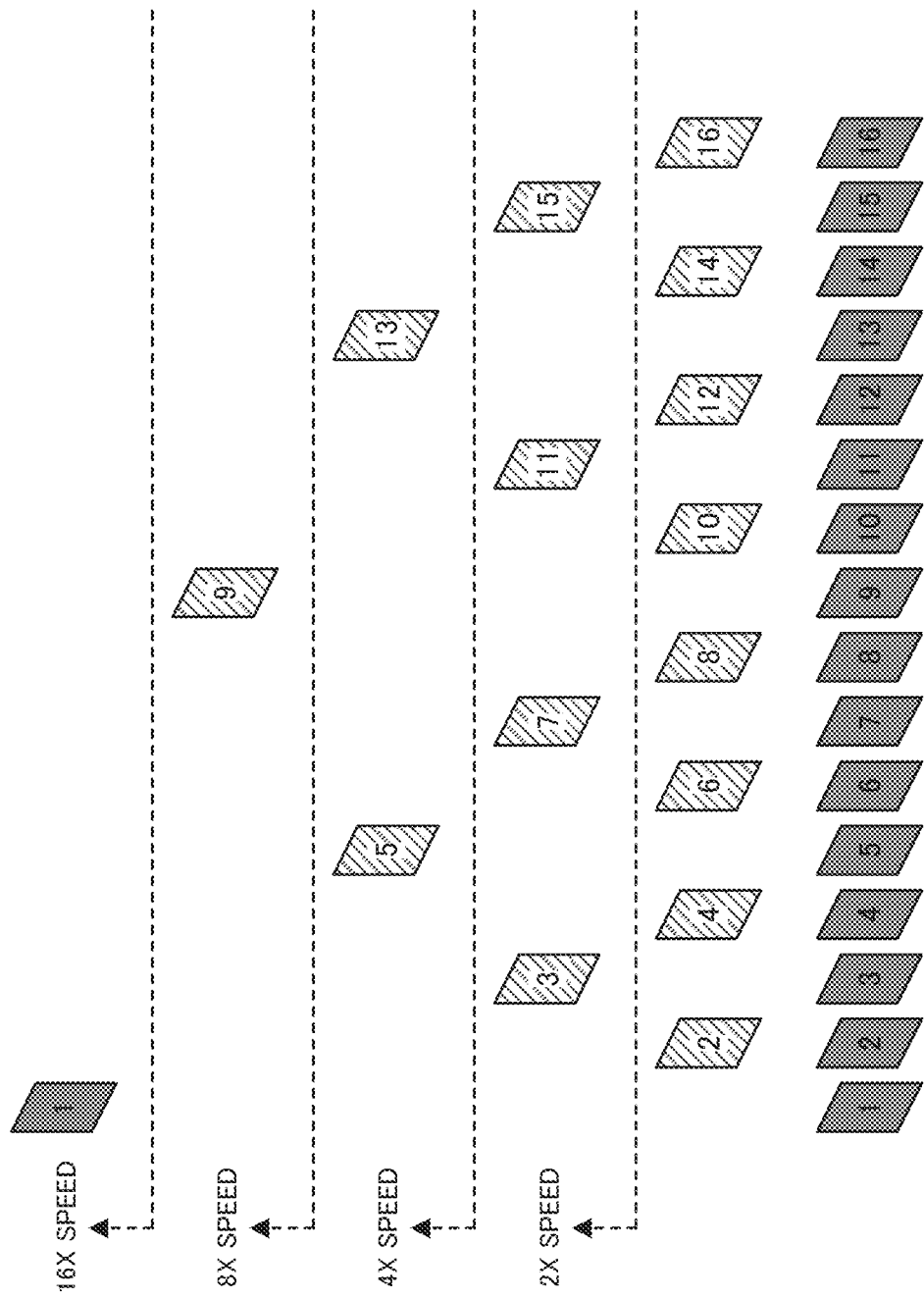

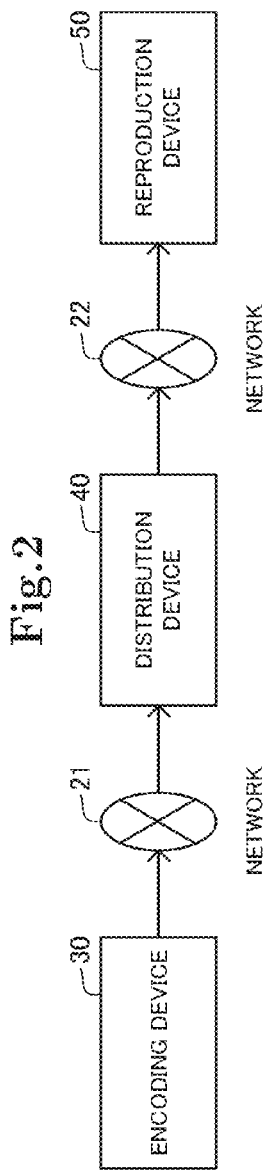
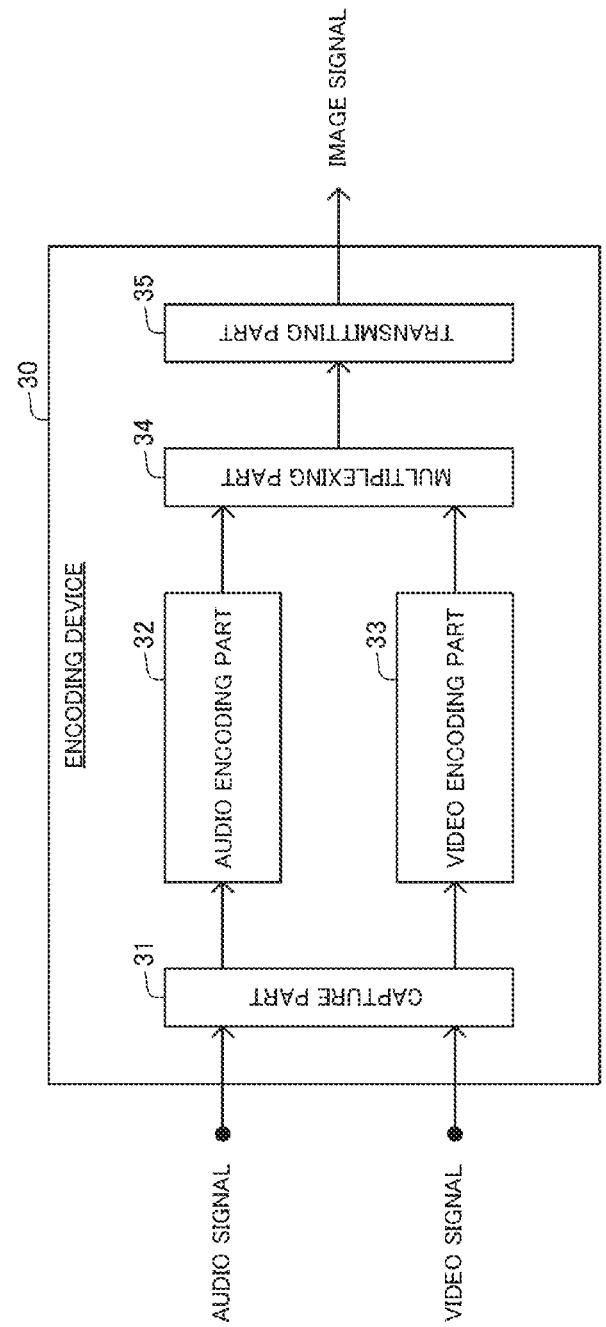

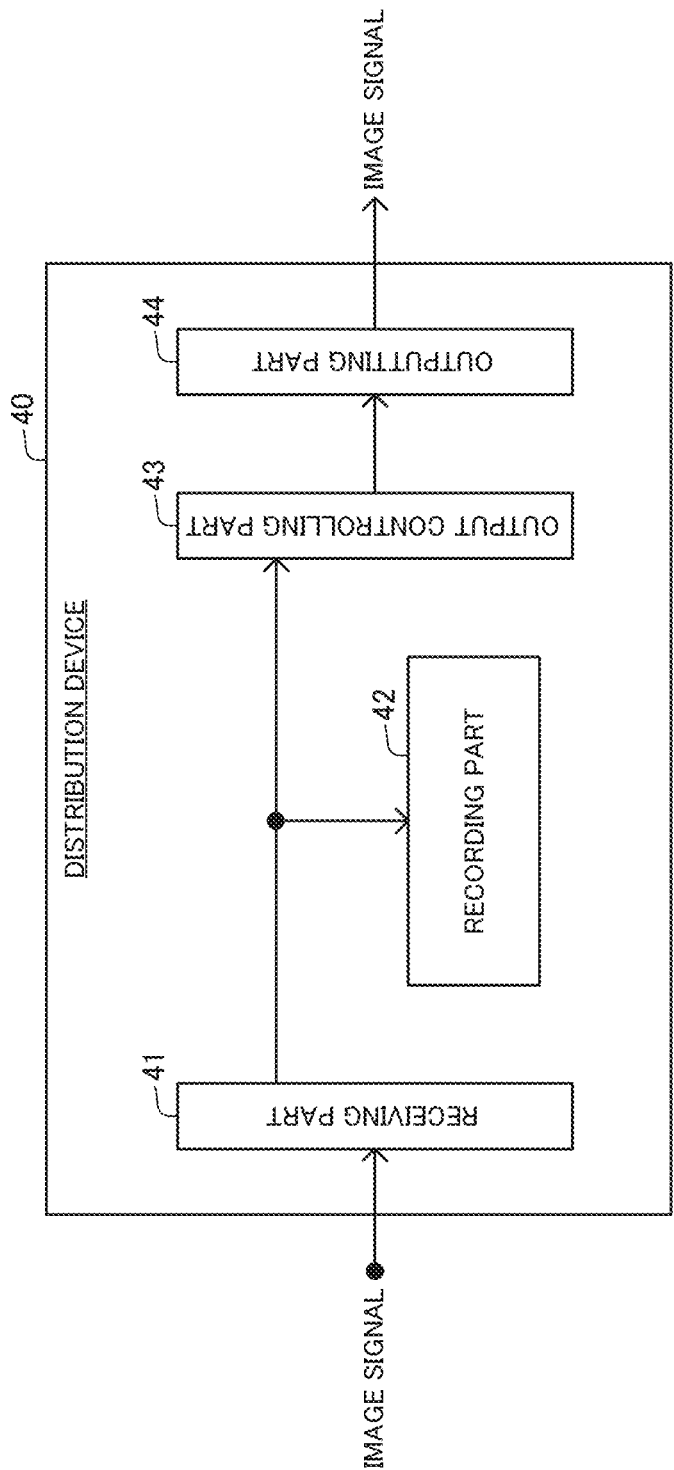

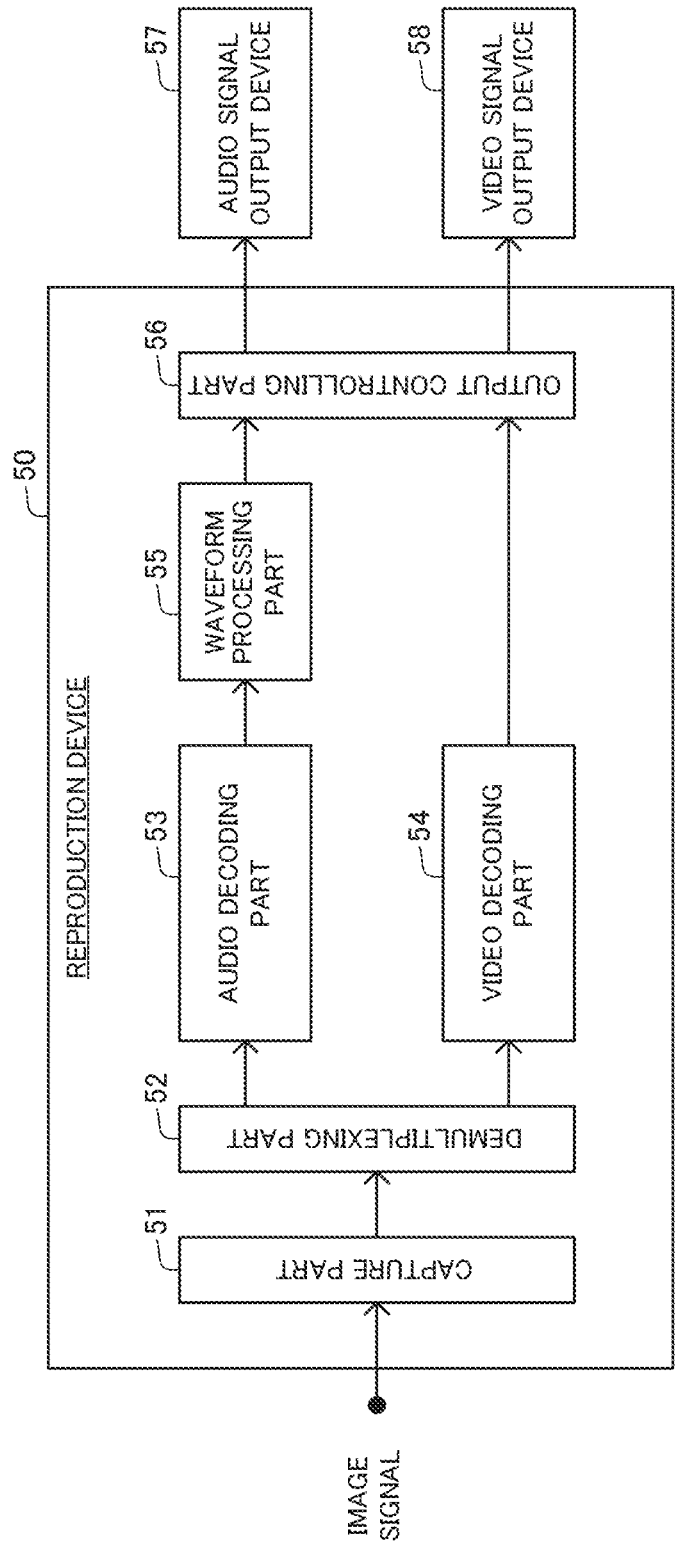

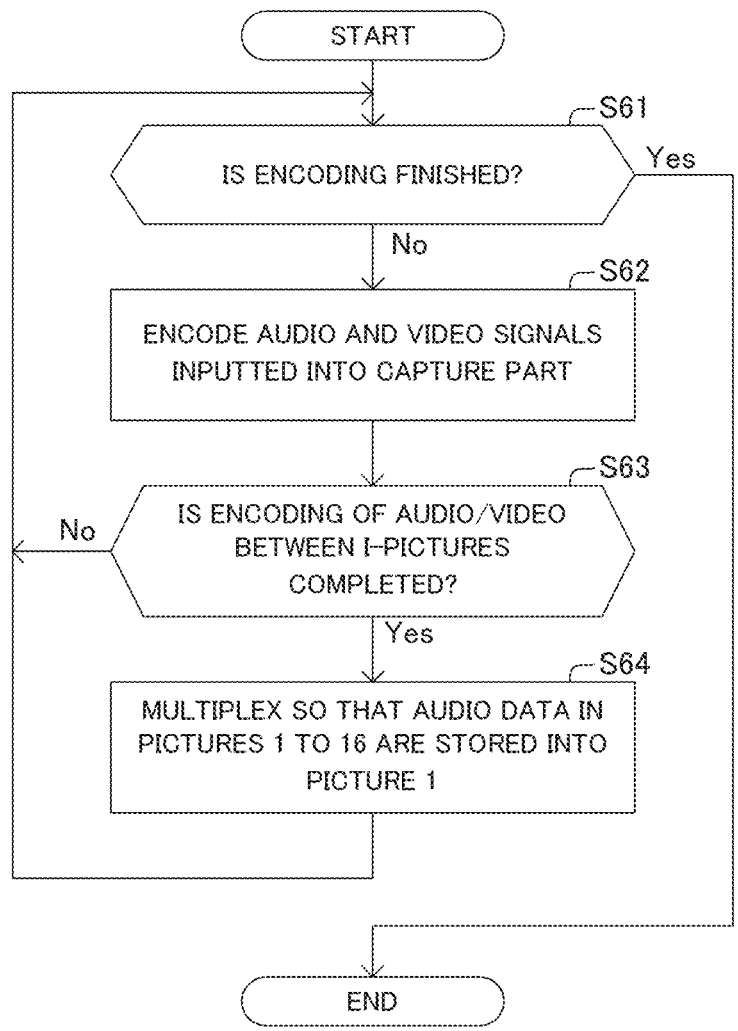

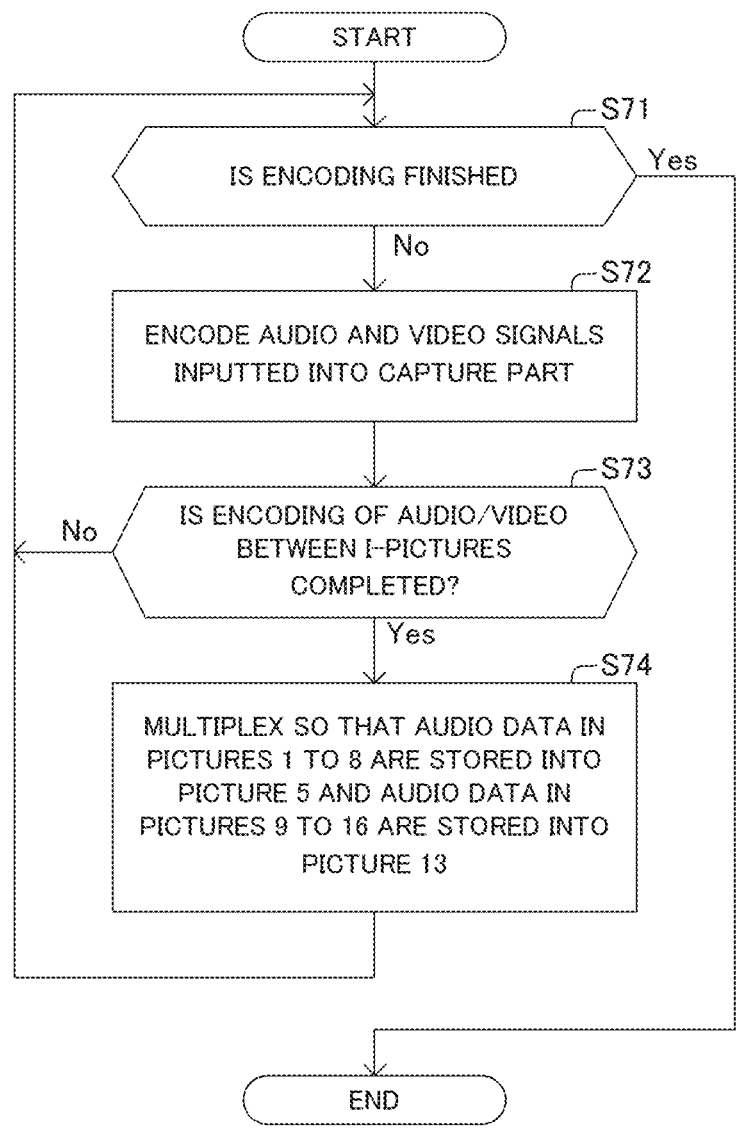

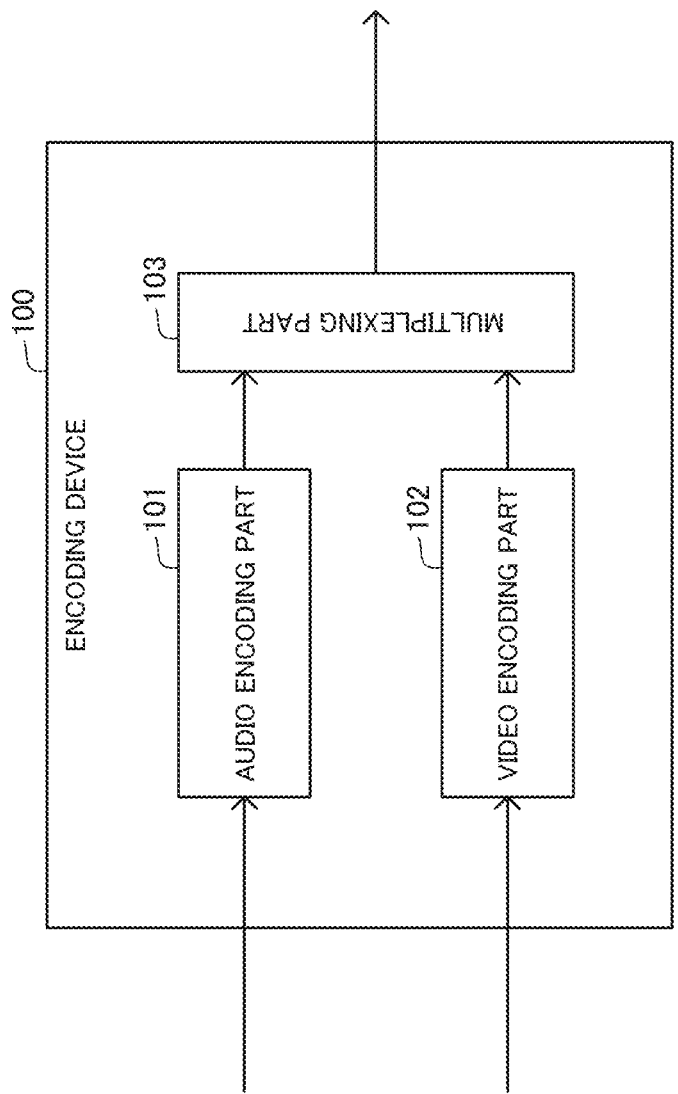

AUDIOVISUAL CONTENT GENERATION METHOD FOR MULTISTAGE HIGH-SPEED REPRODUCTION

INCORPORATION BY REFERENCE

This application is based upon and claims the benefit of priority from Japanese patent application No. 2011-259335, filed on Nov. 28, 2011, the disclosure of which is incorporated herein in its entirety by reference.

TECHNICAL FIELD

The present invention relates to a streaming distribution system.

BACKGROUND ART

A method for relatively easily performing variable high-speed reproduction from one source of audiovisual content in streaming is extracting audiovisual content on a picture basis and distributing to a reproduction device. With regard to this method, however, it is pointed out as a problem that discontinuity of audio data, namely, a data gap is caused and, on the reproduction device, times to output video become uneven, the quality of audio reproduction decreases and underflow or saturation of buffer data occurs.

For variable high-speed reproduction by a reproduction device in streaming distribution, the following methods are proposed:
(1) a distribution device increases an audiovisual content distribution speed to a reproduction speed required by the reproduction device so that the reproduction device can reproduce at the required reproduction speed;
(2) the distribution device keeps audiovisual content previously generated so as to be compatible with a plurality of reproduction speeds, and the distribution device selects and distributes audiovisual content corresponding to a reproduction speed required by the reproduction device;
(3) the distribution device generates in real time and distributes audiovisual content that can be reproduced at a reproduction speed required by the reproduction device; and
(4) by using the characteristic of a data structure of audiovisual content to be distributed, audiovisual content is thinned on a picture basis and distributed.

However, the method (1) has a problem that a network bandwidth used at the time of distribution increases in proportion to the reproduction speed and a large portion of the network bandwidth is wasted when the reproduction speed is high, so that it is not a practical method. The method (2) has a problem that plural types of audiovisual content are necessary for one piece of audiovisual content, and hence, an additional storage region therefor is required and management of content becomes complicated. Moreover, in the method (3), the distribution device needs to decode and encode audiovisual content in real time. Such a processing load is generally high. Considering an influence on the performance like the number of simultaneous distributions, it is not a practical method.

The method (4) is an effective method that solves the respective problems of the methods (1), (2) and (3) and can be relatively easily realized. For example, by MPEG-2 and H.264/MPEG-4 AVC, the distribution device can easily extract data for variable high speed from audiovisual content.

In general, as audiovisual content for streaming distribution, encoded video data and audio data are multiplexed by a transport stream packet (hereinafter, referred to as a TS packet) and used.

Video data and audio data are evenly multiplexed in audiovisual content. Therefore, even if the method (4) is used, audio data contained in a section of pictures are also thinned when pictures of audiovisual content are thinned. As a result, a gap of audio data transmitted to the reproduction device is caused.

When a gap of audio data is caused, the following problems (a) to (c) arise on the reproduction device.

(a) In the case of reproduction while audio is outputted, generally, a reproduction position of audio data is set as a reference, and the output timing of video display is kept with time of audio being reproduced. Therefore, in a case that gaps of audio data with which the timing is kept increase, times to output video becomes uneven.

(b) When video data is thinned on a picture basis, there is a possibility that the size of audio data distributed to the reproduction device is not accurately the size of the reciprocal of a reproduction speed (1/reproduction speed) depending on multiplexing of audiovisual content. This error is accumulated when high-speed reproduction is performed for long hours. When the size of distributed audio data is smaller than the reciprocal of the reproduction speed (1/reproduction speed) of original audio data, a problem affecting the reproduction quality arises on the reproduction device, for example, buffer underflow occurs and an image is not smoothly reproduced. On the contrary, when the size of distributed audio data is larger than the reciprocal of the reproduction speed (1/reproduction speed) of original audio data, buffer saturation occurs on the reproduction device, and a problem affecting the reproduction quality arises, such as both audio data and video data become discontinuous.

(c) Because the distributed audio data contains a discontinuous portion, there is a problem that, when the audio data is reproduced as it is, high frequency is generated and the sound quality lowers. Moreover, even when an audio waveform is multiplied by a window function so that this high frequency is not generated, there is a problem that the sound quality lowers.

[Patent Document 1] Japanese Unexamined Patent Application Publication No. JP-A 11-355719

Addressing the abovementioned problems (a) to (c) arising because of a gap of audio data, Patent Document 1 discloses a technique described below: firstly, multiplexing so that a packet of speech data having a PTS (Presentation Time Stamp) corresponding to time between a PTS of an I-picture and an PTS of a next picture is inserted between packets configuring the I-picture; and then, at the time of high-speed reproduction, separating and outputting the speech data having the PTS between the PTS of the I-picture and the PTS of the next picture, and thereby outputting a favorable speech synchronous with an image even in high-speed reproduction using compressed video data.

However, at the time of high-speed reproduction, there is a matter of whether a speech reproduced at high speeds can be heard or not. Therefore, audio is reproduced in the case of high-speed reproduction up to a desired speed, but there is a case that audio is not reproduced in the case of high-speed reproduction at a higher speed than the desired speed (there is no need to reproduce the audio because it cannot be heard). However, in the method disclosed in Patent Document 1, even when reproduction of audio is unnecessary because the audio is reproduced at a speed higher than the desired speed, all audio data is distributed, so that a problem of waste of a distribution bandwidth arises. In the method of Patent Document 1, the audio distribution bandwidth increases in proportion to a high-speed reproduction rate, so that waste of the distribution bandwidth increases as the reproduction rate becomes higher.

SUMMARY

In consideration of such circumstances, an object of the present invention is to provide an audiovisual content generation method solving a problem that an audio distribution bandwidth increases simply in proportion to a high-speed reproduction rate in the case of reproducing compressed video data at high-speeds and outputting a favorable speech synchronous with an image.

An encoding device according to an exemplary embodiment of the present invention includes: an audio encoding part configured to encode an audio signal; a video encoding part configured to encode a video signal; and a multiplexing part configured to multiplex audio data outputted by the audio encoding part and video data outputted by the video encoding part. The multiplexing part is configured to, at the time of high-speed reproduction, multiplex by locating audio data within a predetermined range into a picture configuring the video data, the picture being distributed at a speed equal to or less than a predetermined reproduction speed but being not distributed at a speed more than the predetermined reproduction speed.

For example, in a case that a picture 5 and a picture 13 are distributed in high-speed reproduction up to the 4× speed but either the picture 5 or the picture 13 is not distributed in high-speed reproduction at the 8× speed or more, audio data of pictures 1 to 8 is located into the picture 5 and multiplexed and audio data of pictures 9 to 16 is located into the picture 13 and multiplexed. Consequently, all of the audio data is distributed to a reproduction device in high-speed reproduction up to the 4× speed, whereas the audio data is not distributed to the reproduction device in high-speed reproduction at the 8× speed or more.

Further, an audiovisual content generation method for multistage high-speed reproduction according to another exemplary embodiment of the present invention is a method executed in an encoding device, and includes: encoding an audio signal; encoding a video signal; and multiplexing audio data and video data outputted as a result of the encoding. The multiplexing is, at the time of high-speed reproduction, multiplexing by locating audio data within a predetermined range into a picture configuring the video data, the picture being distributed at a speed equal to or less than a predetermined reproduction speed but being not distributed at a speed more than the predetermined reproduction speed.

With the configurations described above, the present invention can reduce waste of a distribution bandwidth at the time of high-speed reproduction of audiovisual content.

BRIEF DESCRIPTION OF DRAWINGS

FIG. 1 is a schematic view showing the picture configuration of audiovisual content generated in an exemplary embodiment of the present invention;

FIG. 2 is a block diagram showing the schematic configuration of a streaming distribution system according to the exemplary embodiment of the present invention;

FIG. 3 is a block diagram showing the configuration of an encoding device 30 in this exemplary embodiment;

FIG. 4 is a block diagram showing the configuration of a distribution device 40 in this exemplary embodiment;

FIG. 5 is a block diagram showing the configuration of a reproduction device 50 in this exemplary embodiment;

FIG. 6 is a flowchart showing the flow of an audio data multiplexing process in a technique relating to the present invention;

FIG. 7 is a flowchart showing the flow of an audio data multiplexing process in this exemplary embodiment; and FIG. 8 is a block diagram showing the configuration of an encoding device according to Supplementary Note 1 of the present invention.

EXEMPLARY EMBODIMENT

Below, an exemplary embodiment of the present invention will be described in detail with reference to the drawings. The same components will be denoted by the same reference numerals, and repetition of a description thereof will be omitted.

FIG. 1 is a schematic view showing a picture configuration of audiovisual content generated in an exemplary embodiment of the present invention, that is, the configuration of pictures configuring video data. FIG. 1 shows a picture configuration in the case of N=16, and a picture 1 represents I-picture in MPEG (a picture encoded in a screen). Here, N denotes an interval between I-picture and next I-picture. Moreover, a number written in each of the pictures in FIG. 1 represents the order of final output by a reproduction device. That is to say, in the example shown FIG. 1, as shown at the bottom of FIG. 1, GOP (Group of Pictures) configuring audiovisual content is configured by 16 pictures including three kinds I, P and B. However, in the present invention, the picture configuration of audiovisual content is not limited to the configuration shown in FIG. 1.

FIG. 1 hierarchically shows pictures distributed at each reproduction speed. For example, FIG. 1 shows that, in the case of high-speed reproduction at the 2× speed, a distribution device eliminates pictures 2, 4, 6, 8, 10, 12, 14 and 16 shown by shading among the 16 pictures and distributes pictures 1, 3, 5, 7, 9, 11, 13 and 15 to the reproduction device. Likewise, in the case of high-speed reproduction at the 4× speed, the distribution device further eliminates pictures 3, 7, 11 and 15 shown by shading, and distributes pictures 1, 5, 9 and 13 to the reproduction device.

In general, video data and audio data are evenly multiplexed in audiovisual content, and therefore, at the time of high-speed reproduction, pictures are distributed to the reproduction device after audio data included in the eliminated pictures is also eliminated.

In a specific exemplary embodiment of the present invention, audiovisual content is generated so that all audio data is transmitted to the reproduction device, by aggregating the audio data to a specific picture to be transmitted to the reproduction device and multiplexing the audio data even when high-speed reproduction of the audio data is performed, at the time of multiplexing the audiovisual content. In a related art, for example, as a result of aggregating audio data of the pictures 1 to 16 to the picture 1, all of the audio data is transmitted to the reproduction device even when high-speed reproduction at any of the 2× speed, 4× speed, 8× speed and 16× speed is performed. On the other hand, in a predetermined exemplary embodiment of the present invention, for example, by aggregating audio data of the pictures 1 to 8 to the picture 5 and aggregating audio data of the picture 9 to 16 to the picture 13, all of the audio data is transmitted to the reproduction device when high-speed reproduction at the 2× speed and the 4× speed is performed. However, when high-speed reproduction at the 8× speed and the 16× speed is performed, the audio data is not transmitted to the reproduction device. Thus, in a case that reproduction of audio is unnecessary, it is possible to transmit no audio data to the reproduction device.

FIG. 2 is a block diagram showing the schematic configuration of a streaming distribution system according to the exemplary embodiment of the present invention. In this exemplary embodiment, a streaming distribution system 10 includes an encoding device 30, a distribution device 40, and a reproduction device 50. The encoding device 30 and the distribution device 40 are connected by a network 21, and the distribution device 40 and the reproduction device 50 are connected by a network 22.

FIG. 3 is a block diagram showing the configuration of the encoding device 30 in this exemplary embodiment. In FIG. 3, a capture part 31 is a device which captures an audio signal and a video signal from an external device: for example, a capture board, and a device which receives data from a USB camera and an IP camera. An audio encoding part 32 is a device or a program for encoding the inputted audio signal. A video encoding part 33 is a device or a program for encoding the inputted video signal. A multiplexing part 34 is a device or a program for multiplexing data of audio and data of video outputted by the audio encoding part 32 and the video encoding part 33, by a TS packet. A transmitting part 35 is a device which transmits audiovisual content to a network: for example, a network card. It is described above that each of the audio encoding part 32, the video encoding part 33 and the multiplexing part 34 may be a program. That is to say, by execution of the program by an arithmetic device provided in the encoding device 30, each of the parts 32, 33 and 34 is constructed within the arithmetic device.

FIG. 4 is a block diagram showing the configuration of the distribution device in this exemplary embodiment. In FIG. 4, a receiving part 41 is a device, such as a network card, which receives the audiovisual content from the network. A recording part 42 is a device, such as an HDD and an SSD, for storing the audiovisual content. An output controlling part 43 is a device or a program for extracting audiovisual content to be distributed from among the audiovisual content recorded in the recording part 42 and, at the time of high-speed reproduction, executing a process of thinning data and outputting the data to an outputting part 44. An outputting part 44 is a device, such as a network card, for transmitting the audiovisual content to the network. It is described that the output controlling part 43 may be a program. That is to say, by execution of the program by an arithmetic device provided in the distribution device 40, the output controlling part 43 is constructed within the arithmetic device.

FIG. 5 is a block diagram showing the configuration of the reproduction device 50 in this exemplary embodiment. In FIG. 5, a receiving part 51 is a device, such as a network card, which receives the audiovisual content from the network. A demultiplexing part 52 is a device or a program for demultiplexing the audiovisual content into audio data and video data. An audio decoding part 53 is a device or a program which decodes the audio data encoded by the encoding device 30. A video decoding part 54 is a device or a program which decodes the video data encoded by the encoding device 30. A waveform processing part 55 is a device or a program for executing time stretching on the waveform of the audio decoded by the audio decoding part 53 to obtain the reciprocal of the reproduction speed (1/reproduction speed). Time stretching includes a process of shortening a temporal axis without changing the pitch. An output controlling part 56 is a device or a program which executes reproduction control such as control of the output timing of the signals outputted by the waveform processing part 55 and the video decoding part 54. An audio signal output device 57 is a device, such as a speaker, which outputs the audio signal. A video signal output device 58 is a device, such as a liquid crystal display, which outputs the video signal. It is described above that each of the demultiplexing part 52, the audio decoding part 53, the video decoding part 54, the waveform processing part 55 and the output controlling part 56 may be a program. That is to say, by execution of the program by an arithmetic device provided in the reproduction device 50, each of the parts 52, 53, 54, 55 and 56 is constructed within the arithmetic device.

Next, an operation of the streaming distribution system 10 according to this exemplary embodiment will be described.

In the encoding device 30, the audio encoding part 32 and the video encoding part 33 encode an audio signal and a video signal inputted into the capture part 31, respectively. The encoded audio data and video data are multiplexed by a TS packet by the multiplexing part 34, and transmitted to the distribution device 40 by the transmitting part 35.

As one example, a case of using content of N=16, H.264/MPEG-4 AVC will be described. In a procedure of multiplexing by a TS packet, for example, as shown in a sequence of FIG. 7, when encoding of data of audio and video between I-pictures (i.e., of the pictures 1 to 16) has been completed, the data is multiplexed so that audio data corresponding to the pictures 1 to 8 is located into the picture 5 and audio data corresponding to the pictures 9 to 16 is located into the picture 13.

The distribution device 40 accumulates data received from the encoding device 30 into the recording part 42. The output controlling part 43 retrieves audiovisual content to be distributed from among audiovisual content recorded in the recording part 42 and, at the time of high-speed reproduction, executes a process of thinning video data on a picture basis, and outputs the data to the outputting part 44. As shown in FIG. 1, in the case of high-speed reproduction at the 2× speed, the output controlling part 43 executes a thinning process of eliminating the pictures 2, 4, 6, 8, 10, 12, 14 and 16 shown by shading so that the pictures 1, 3, 5, 7, 9, 11, 13 and 15 are distributed. Moreover, in the case of high-speed reproduction at the 4× speed, the output controlling part 43 executes a thinning process of eliminating the pictures 3, 7, 11 and 15 shown by shading so that the pictures 1, 5, 9 and 13 are distributed in addition to the process at the time of reproduction at the 2× speed. Moreover, in the case of high-speed reproduction at the 8× speed, the output controlling part 43 executes a thinning process of eliminating the pictures 5 and 13 shown by shading so that the pictures 1 and 9 are distributed in addition to the process at the time of reproduction at the 4× speed. Then, in the case of high-speed reproduction at the 16× speed, the output controlling part 43 executes a thinning process of eliminating the picture 9 shown by shading so that the picture 1 is distributed in addition to the process at the time of reproduction at the 8× speed. As the thinning process, it is possible to use a known method such as Temporal Scalability.

In the reproduction device 50, the demultiplexing part 52 demultiplexes the audiovisual content distributed from the distribution device 40 into audio data and video data, and the audio decoding part 53 and the video decoding part 54 decode the audio data and the video data, respectively. Moreover, the waveform processing part 55 executes time stretching on the waveform of audio decoded by the audio decoding part 53 to obtain the reciprocal of the reproduction speed (1/reproduction speed). The output timing of the decoded audio and video is controlled by the output controlling part, and the audio and video are outputted to the audio signal output device and a video signal output device, respectively. The processing method by the waveform processing part is not limited to this, and can be any method as far as a reproduction time becomes the reciprocal of a reproduction speed (1/reproduction speed). Therefore, in a case that the pitch at the time of reproduction may become high, it is also possible to execute a process of simply making the number of samples the reciprocal of a reproduction speed (1/reproduction speed).

FIG. 6 shows a flowchart of an audio data multiplexing process in a related art for comparison with the process in this exemplary embodiment. As shown in FIG. 6, in this related art, the audio encoding part 32 and the video encoding part 33 of the encoding device 30 encode audio signals and video signals inputted into the capture part 31 (S62). When encoding of audio signals and video signals between I-pictures is completed (S63), the multiplexing part 34 multiplexes the audio data so that audio data in pictures 1 to 16 is stored into the picture 1 (S64). This process is executed until an encoding process ends (S61).

In the abovementioned related art, the audio data corresponding to the pictures 1 to 16 is located in the picture 1 and, even when high-speed reproduction at any of the 2× speed, 4× speed, 8× speed and 16× speed is performed, the picture 1 is included in data distributed to the reproduction device 50. Thus, all speech data is distributed at the time of high-speed reproduction. Therefore, reproduction in a time of the reciprocal of an accurate reproduction speed (1/reproduction speed) is allowed, time stretching or the like can be executed, and easy-to hear audio reproduction can be realized even in high-speed reproduction.

However, the related art described above has a problem that when, for example, an audio bit rate is 96 Kbps and high-speed reproduction at the 16× speed is performed, audio data amounts to 1.5 Mbps. In consideration of whether a speech reproduced at high speeds can be heard, the reproduction device 50 reproduces audio at the time of high-speed reproduction up to a desired speed (herein, denoted by P) but in some cases, does not need to reproduce audio at the time of reproduction at higher speeds. However, in the abovementioned related art, a large amount of audio data is transmitted even when it is not necessary to reproduce audio.

On the contrary, this exemplary embodiment solves the abovementioned problem by properly selecting a picture in which audio data is located depending on a desired speed (P) at which audio reproduction is necessary.

FIG. 7 is a flowchart showing the flow of an audio data multiplexing process in this exemplary embodiment. In this exemplary embodiment, instead of multiplexing audio data so that the audio data within the pictures 1 to 16 is stored into the picture 1 in the related art described above, the multiplexing part multiplexes audio data so that audio data in a predetermined range is stored into a predetermined picture depending on a desired speed (P).

For example, in the case of a desired speed P=4, that is, in a case that a speed at which audio reproduction is required is the 4× speed, as shown in a sequence of FIG. 7, the multiplexing part multiplexes so as to locate the audio data of the pictures 1 to 8 into the picture 5 and locate the audio data of the pictures 9 to 16 into the picture 13 in FIG. 1 (S74). In the case of the thus multiplexed audiovisual content, the pictures 5 and 13 are distributed at the time of high-speed reproduction up to the 4× speed, so that all of the audio data is distributed to the reproduction device 50. However, in the case of high-speed reproduction at the 8× speed or more, either the picture 5 or the picture 13 is not distributed. Consequently, it is possible to distribute all audio data to the reproduction device 50 and reproduce audio at the time of high-speed reproduction at a desired speed or less, whereas it is possible to distribute no audio data to the reproduction device 50 at the time of high-speed reproduction such that audio reproduction is unnecessary (in this case, at the 8× speed or more).

In general, it takes longer time to decode in a video decoding process than in an audio decoding process because of the difference of computation amounts. Therefore, in order to prevent a problem from occurring after the reproduction device decodes video data, that audio data corresponding to the picture has already been outputted by the audio single output device 57 shown in FIG. 5, there is a case of multiplexing video data earlier than audio data. However, there is no problem as far as the number of a picture to locate is not different. For example, audio for the pictures 1 to 8 and audio for the pictures 9 to 16 may be located in following picture 5 and picture 13, respectively.

The present invention is not limited to the exemplary embodiment described above, and can be embodied in a variety of other forms within the scope of the present invention. Therefore, the above exemplary embodiment is only an example in every aspect, and is not interpreted limitedly. For example, it is possible to execute the respective processing steps described above in any order or in parallel as far as the processing content does not become inconsistent.

The whole or part of the exemplary embodiment disclosed above can be described as, but not limited to, the following supplementary notes. The configuration of an encoding device disclosed in Supplementary Note 1 is shown in FIG. 8.

(Supplementary Note 1)

An encoding device 100, comprising: an audio encoding part 101 configured to encode an audio signal; a video encoding part 102 configured to encode a video signal; and a multiplexing part 103 configured to multiplex audio data outputted by the audio encoding part 101 and video data outputted by the video encoding part 102, wherein the multiplexing part 103 is configured to, at the time of high-speed reproduction, multiplex by locating audio data within a predetermined range into a picture configuring the video data, the picture being distributed at a speed equal to or less than a predetermined reproduction speed but being not distributed at a speed more than the predetermined reproduction speed.

(Supplementary Note 2)

The encoding device according to Supplementary Note 1, wherein: the high-speed reproduction is performed by a thinning process of eliminating a predetermined picture from the video data depending on a reproduction speed; and the multiplexing part is configured to multiplex by locating the audio data into the picture eliminated from the video data in a case that the reproduction speed is more than the predetermined reproduction speed.

(Supplementary Note 3)

The encoding device according to Supplementary Note 1 or 2, further comprising: a capture part configured to receive the audio signal and the video signal; and a transmitting part configured to transmit an audiovisual signal outputted by the multiplexing part.

(Supplementary Note 4)

A streaming distribution system, comprising: the encoding device according to any of Supplementary Notes 1 to 3; a distribution device configured to distribute an audiovisual signal from the encoding device; and a reproduction device configured to reproduce the audiovisual signal distributed by the distribution device.

(Supplementary Note 5)

An audiovisual content generation method in an encoding device, comprising: encoding an audio signal; encoding a video signal; and multiplexing audio data and video data outputted as a result of the encoding, wherein the multiplexing is, at the time of high-speed reproduction, multiplexing by locating audio data within a predetermined range into a picture configuring the video data, the picture being distributed at a speed equal to or less than a predetermined reproduction speed but being not distributed at a speed more than the predetermined reproduction speed.

(Supplementary Note 6)

The audiovisual content generation method according to Supplementary Note 5, wherein: the high-speed reproduction is performed by a thinning process of eliminating a predetermined picture from the video data depending on a reproduction speed; and the multiplexing is multiplexing by locating the audio data into the picture eliminated from the video data in a case that the reproduction speed is more than the predetermined reproduction speed.

(Supplementary Note 7)

A storage medium storing a program comprising instructions for causing an encoding device including an audio encoding part configured to encode an audio signal and a video encoding part configured to encode a video signal to realize a multiplexing part configured to multiplex audio data outputted by the audio encoding part and video data outputted by the video encoding part, wherein the multiplexing part is configured to, at the time of high-speed reproduction, multiplex by locating audio data within a predetermined range into a picture configuring the video data, the picture being distributed at a speed equal to or less than a predetermined reproduction speed but being not distributed at a speed more than the predetermined reproduction speed.

(Supplementary Note 8)

The storage medium storing the program according to Supplementary Note 7, wherein: the high-speed reproduction is performed by a thinning process of eliminating a predetermined picture from the video data depending on a reproduction speed; and the multiplexing part is configured to multiplex by locating the audio data into the picture eliminated from the video data in a case that the reproduction speed is more than the predetermined reproduction speed.

According to the present invention, as a first effect, a reproduction device can perform smooth reproduction at even video output timing. This is because all audio data is distributed to the reproduction device and therefore the reproduction device can make the video output timing accurately coincide with audio to be reproduced.

According to the present invention, as a second effect, loss of the quality of reproduction by the reproduction device due to saturation or underflow of data can be avoided even when high-speed reproduction is performed for long hours. This is because all audio data is distributed to the reproduction device and therefore the reproduction device can perform high-speed reproduction at an accurate reproduction speed.

According to the present invention, as a third effect, it becomes possible to realize easy-to-hear audio reproduction even at the time of high-speed reproduction. This is because all audio data is distributed to the reproduction device and therefore the reproduction device can execute time stretching (shorten a temporal axis without changing the pitch), or the like.

According to the present invention, as a fourth effect, even when pictures to be distributed are thinned for the purpose of temporarily reducing a bandwidth used for distribution in order to regulate a network bandwidth during streaming reproduction, a frame rate decreases but an influence on the quality of audio reproduction can be avoided on the reproduction device. This is because all audio data is distributed to the reproduction device in a case that pictures are thinned as in the case of high-speed reproduction.

The abovementioned program is recorded in a storage device, or recorded on a computer-readable recording medium. For example, the recording medium is a portable medium such as a flexible disk, an optical disk, a magneto-optical disk, and a semiconductor memory.

Although the present invention has been described above with reference to the exemplary embodiments, Supplementary Notes, and so on, the present invention is not limited to the exemplary embodiments described above. The configurations and details of the present invention can be altered in various manners that can be understood within the scope of the present invention.

The invention claimed is:

1. An encoding device implemented on a hardware processor, comprising:
    an audio encoding device, implemented on the hardware processor, configured to encode an audio signal;
    a video encoding device, implemented on the hardware processor, configured to encode a video signal; and
    a multiplexing device, implemented on the hardware processor, configured to multiplex audio data outputted by the audio encoding device and video data outputted by the video encoding device,
    the encoding device configured to perform high-speed reproduction in which a process of thinning video data on a picture basis and outputting the video data is executed corresponding to a reproduction speed,
    wherein the multiplexing device is configured to, at the time of high-speed reproduction, multiplex by locating the audio data into a picture configuring the video data, the picture being distributed at a speed equal to or less than a predetermined reproduction speed but being not distributed and being thinned at a speed more than the predetermined reproduction speed.

2. The encoding device according to claim 1, wherein:
    the high-speed reproduction is performed by a thinning process of eliminating a predetermined picture from the video data depending on a reproduction speed; and
    the multiplexing part is configured to multiplex by locating the audio data into the picture eliminated from the video data in a case that the reproduction speed is more than the predetermined reproduction speed.

3. The encoding device according to claim 1, further comprising:
    a capture part configured to receive the audio signal and the video signal; and
    a transmitting part configured to transmit an audiovisual signal outputted by the multiplexing part.

4. A streaming distribution system, comprising:
    encoding device according to claim 1;
    a distribution device configured to distribute an audiovisual signal from the encoding device; and
    a reproduction device configured to reproduce the audiovisual signal distributed by the distribution device.

5. An audiovisual content generation method in an encoding device comprising:
    encoding an audio signal;
    encoding a video signal; and
    multiplexing audio data and video data ouputted as a result of the encoding,
    performing high-speed reproduction in which a process of thinning video data on a picture basis and outputting the video data is executed corresponding to a reproduction speed,
    wherein the multiplexing is, at the time of high-speed reproduction, multiplexing by locating the audio data into a picture configuring the video data, the picture being distributed at a speed equal to or less than a predetermined reproduction speed but not being distributed and being thinned at a speed more than the predetermined reproduction speed.

6. The audiovisual content generation method according to claim 5, wherein:

the high-speed reproduction is performed by a thinning process of eliminating a predetermined picture from the video data depending on a reproduction speed; and the multiplexing is multiplexing by locating the audio data into the picture eliminated from the video data in a case that the reproduction speed is more than the predetermined reproduction speed.

* * * * *